(12) United States Patent
Sridhar et al.

(10) Patent No.: US 6,186,568 B1
(45) Date of Patent: Feb. 13, 2001

(54) CORE PLATE LIFTING FIXTURE AND RELATED PROCESS

(75) Inventors: Bettadapur N. Sridhar, Cupertino; Fred C. Nopwaskey, San Jose; Stephen K. Parker, Fremont; Frank C. Falzone, Santa Clara, all of CA (US)

(73) Assignee: General Electric Company, Schenectady, NY (US)

( * ) Notice: Under 35 U.S.C. 154(b), the term of this patent shall be extended for 0 days.

(21) Appl. No.: 09/335,695

(22) Filed: Jun. 18, 1999

(51) Int. Cl.[7] ....................................................... B66C 1/66
(52) U.S. Cl. ............................................. 294/93; 294/906
(58) Field of Search .................................. 294/93, 94, 96, 294/97, 34, 86.24, 86.25, 119.1, 906; 279/2.19, 2.2

(56) References Cited

U.S. PATENT DOCUMENTS

| | | | |
|---|---|---|---|
| 1,835,418 | * 12/1931 | McHardy | 294/97 |
| 2,538,693 | * 1/1951 | Maisch | 294/93 |
| 2,610,888 | * 9/1952 | Pace | 294/93 |
| 3,116,663 | * 1/1964 | Musgrave | 294/97 |
| 3,265,431 | * 8/1966 | Burner | 294/86.25 |
| 3,307,871 | * 3/1967 | Russell et al. | 294/97 |
| 3,314,714 | * 4/1967 | Brubaker | 294/93 |
| 3,355,792 | * 12/1967 | Cunningham | 294/93 |
| 4,948,187 | * 8/1990 | Blaseck | 294/906 |
| 5,328,180 | * 7/1994 | Benavides et al. | 279/2.19 |
| 5,988,719 | * 11/1999 | Lavender | 294/96 |

* cited by examiner

*Primary Examiner*—Dean J. Kramer
(74) *Attorney, Agent, or Firm*—Nixon & Vanderhye P.C.

(57) ABSTRACT

A lifting fixture includes a housing; a plurality of jaws movable radially in and out of the housing to secure the fixture to a component to be lifted; at least one lifting bail extending from on end of the housing; and a screw mechanism operatively connected to the plurality of jaws for moving the jaws radially between an inward retracted position and an outward locking position. A related lifting and flipping process is also disclosed.

12 Claims, 7 Drawing Sheets

CORE PLATE LIFTING FIXTURE AND RELATED PROCESS

BACKGROUND OF THE INVENTION

This invention generally relates to nuclear reactor vessels, and specifically to a unique lifting fixture and related process for the core support plate.

In a nuclear reactor pressure vessel, the core support plate provides lateral support and guidance to the control rod guide tubes, peripheral support pieces, in-core flux monitor guide tubes, and start-up neutron sources. The core plate itself is formed with an array of holes through which the control rod guide tubes pass. The core plate assembly is bolted to a support ledge between the central and lower portions of the core shroud. During core shroud replacement procedures, the core plate is typically removed and transported underwater to another location where it is cut or sliced into multiple pieces for disposal. After removal and during transport, the core plate is typically supported in an upright orientation on a support stand provided with an annular array of vertical supports, each of which has a horizontal support ledge upon which the core plate rests. Because of the geometry of the core plate, as well as the configuration of certain cutting tools, it is necessary to flip the core plate to an upside down orientation prior to slicing to allow access to the support structure of the core plate on the underside.

BRIEF SUMMARY OF THE INVENTION

This invention provides a core plate lifting fixture particularly useful for combined lifting and flipping of the core plate prior to slicing in an underwater environment. Despite inherent space limitations, the fixture is designed to withstand heavy loads, particularly moment loads encountered during the flipping operation. In a typical situation, four fixtures are attached at selective locations about the core plate. Each fixture can be installed within, or removed from a selected core plate hole via radially movable jaws actuated by a vertically oriented screw mechanism. The fixture is configured to have attachment or lifting eyes or bails projecting from both the upper and lower sides of the core plate, and the screw mechanism is accessible from both sides of the fixture (and hence, both sides of the core plate). Each of the lifting bails is also pivotable about a horizontal axis, within an approximate 180° range to enable easy access to the screw mechanism and to permit some swiveling motion for the hooks.

The invention also relates to a method of flipping or inverting the core plate, generally described as follows. The core plate is supported on a stand which is, in turn, supported on a turntable. Each of the four fixtures is inserted into a selected core plate hole, and the radial jaws are moved outwardly by turning the screw device from a remote location. After the fixtures are attached to the core plate, a crane is employed to lift the core plate by means of at least two of the fixtures, turned sideways and flipped over, and then set back down. The jaws are then radially retracted and the fixtures removed from the core plate. A more detailed description of the method is disclosed further herein.

In its broader aspects, therefore, the present invention relates to a lifting fixture comprising a housing; a plurality of jaws movable radially in and out of the housing to secure the fixture to a component to be lifted; at least one lifting bail extending from one end of the housing; and a screw mechanism operatively connected to the plurality of jaws for moving the jaws between a radial inward retracted position and a radial outward locked position.

In another aspect, the invention relates to a method of inverting a nuclear reactor core plate supported on a stand comprising a) attaching at least first and second lifting fixtures to the core plate, each fixture having an upper lifting bail and a lower lifting bail projecting, respectively, from upper and lower sides of the core plate; b) operatively attaching first and second grapples connected to a crane for selective movement to the upper lifting bails, respectively, of the first and second lifting fixtures; c) lifting the core plate off the stand; d) selectively manipulating the grapples to tilt the core plate on end and resting it on the stand, with the first grapple and first lifting fixture closest to the stand; e) releasing the first grapple, rotating the core plate and attaching the first grapple to the lower lifting bail of the second lifting fixture; f) releasing the second grapple from the upper lifting fixture of the second lifting fixture, rotating the core plate and attaching the second grapple to the lower lifting bail of the first lifting fixture; g) selectively manipulating the grapples to lift and level the core plate; and h) lowering the core plate onto the stand.

DETAILED DESCRIPTION OF THE INVENTION

Figure 1:
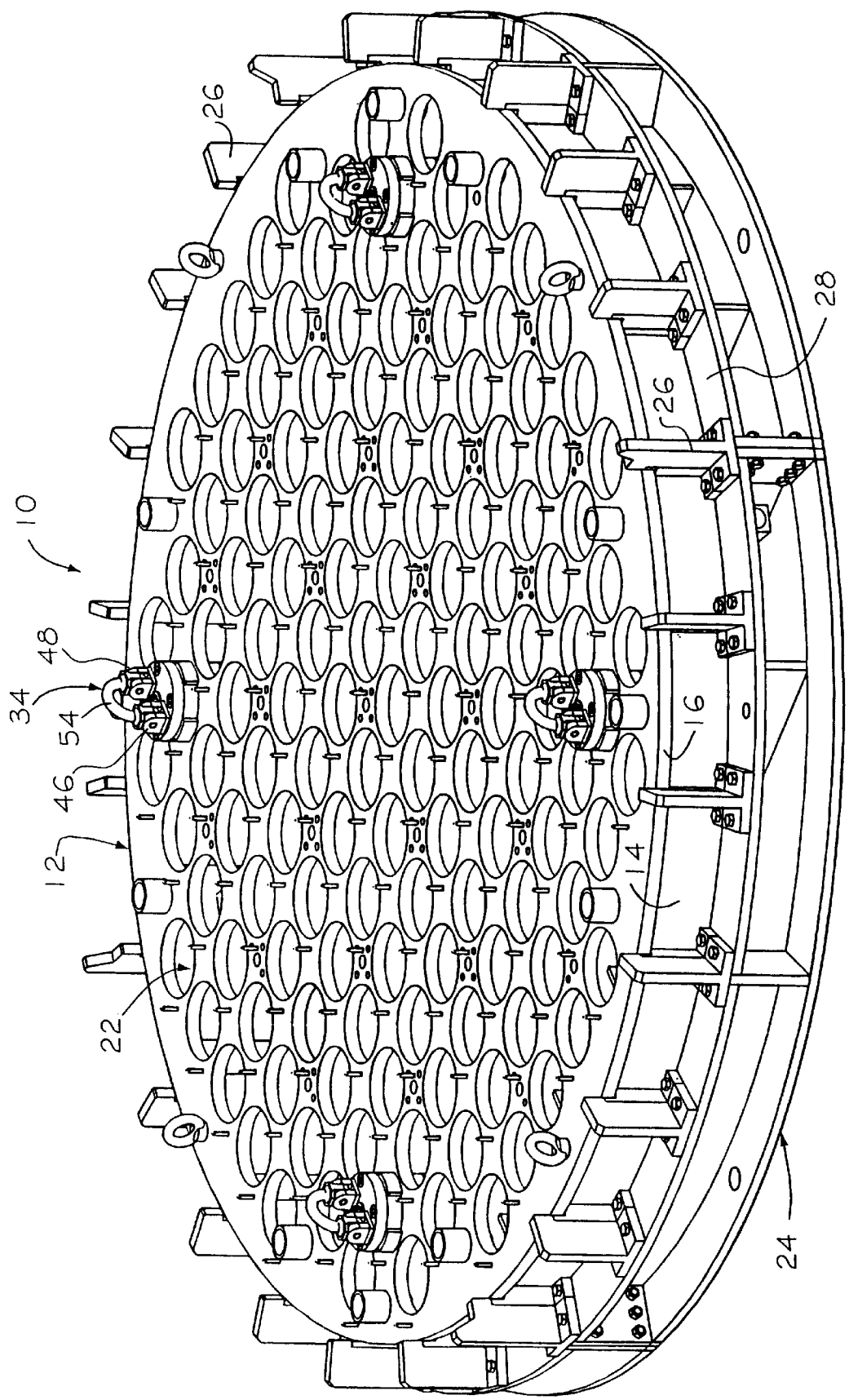
FIG. 1 is a perspective view of a nuclear reactor core plate supported on a support stand.
Figure 4:
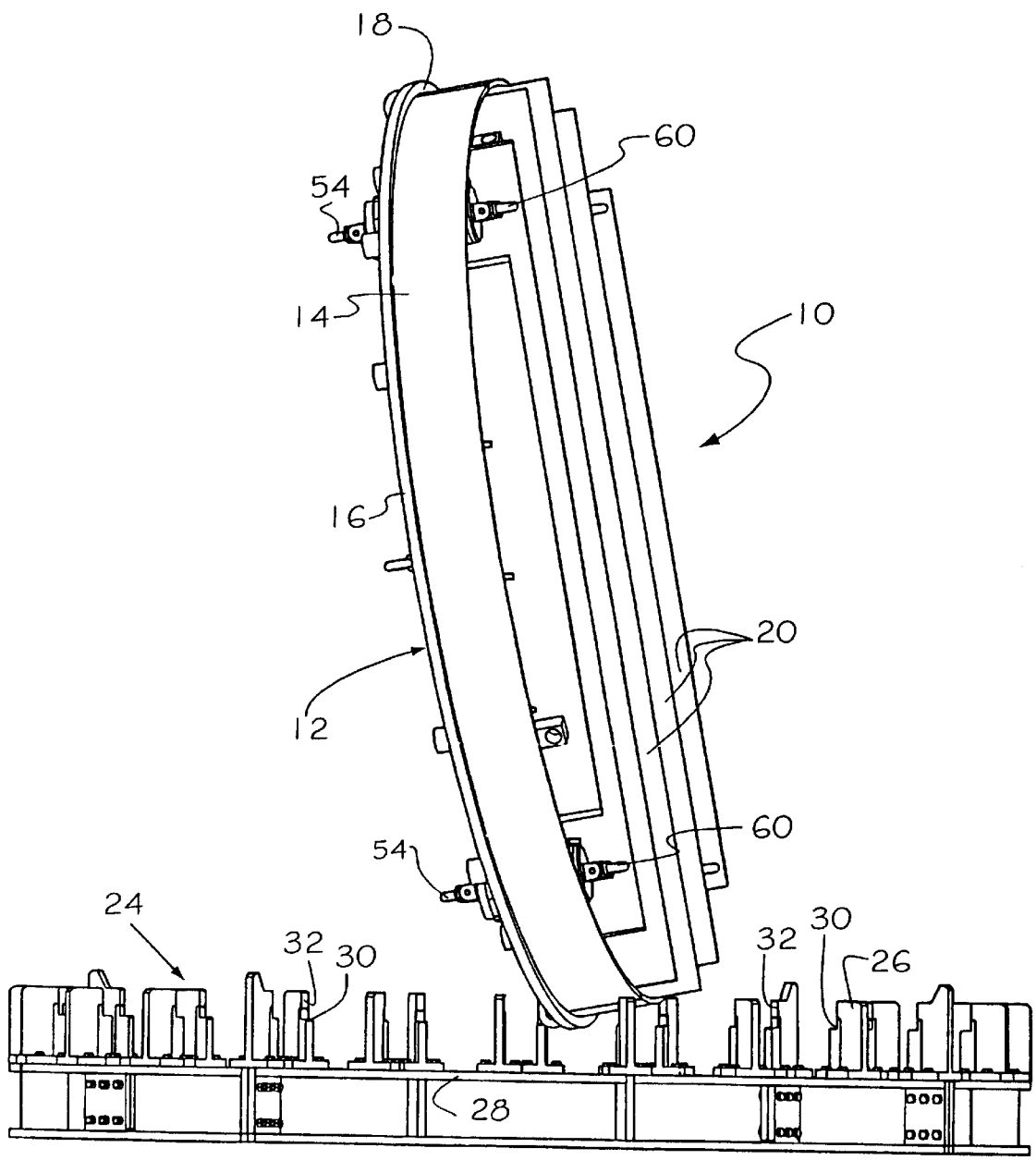
FIG. 4 is a side elevation showing the core plate lifted and turned on edge during a flipping operation (grapples not shown for sake of clarity)

With reference to FIGS. 1 and 4, a core plate assembly 10 includes a flat, circular plate 12 with a downwardly projecting annular skirt 14 located slightly radially inwardly of a peripheral edge 16 of the plate, leaving a horizontal marginal edge 18 exposed outwardly of the skirt, on the underside of the plate. A plurality of vertically oriented flow guides 20 extend across the lower side of the plate 12 within, but projecting below, the skirt 14. An array of through holes 22 are formed in the plate 12, providing support for the reactor control rod guide tubes (not shown). As illustrated in FIG. 1, the assembly 10 is supported in an upright orientation on a support stand 24. The stand 24 includes a plurality of upright brackets 26 fixed to an upper ring 28 of the stand, each bracket 26 having a horizontally oriented ledge 30. The marginal edge 18 of the plate 12 is supported on the plurality of ledges 30, and confined horizontally by vertically oriented stops 32 extending upwardly from respective ledges 30. The stand 24 may be supported for rotation on a turntable described further herein in connection with FIGS. 5A–5H. This is the orientation of the core plate assembly 10 after removal from a nuclear reactor core shroud (not shown), and as situated under water, prior to a core plate slicing operation.

Four core plate lifting fixtures 34 are shown secured to the core plate 12 at equally spaced locations about the marginal edge of the plate. Each fixture 34 is mounted in a selected one of the holes 22 as described below. Since the fixtures are identical, only one need be described in detail.

Figure 2:
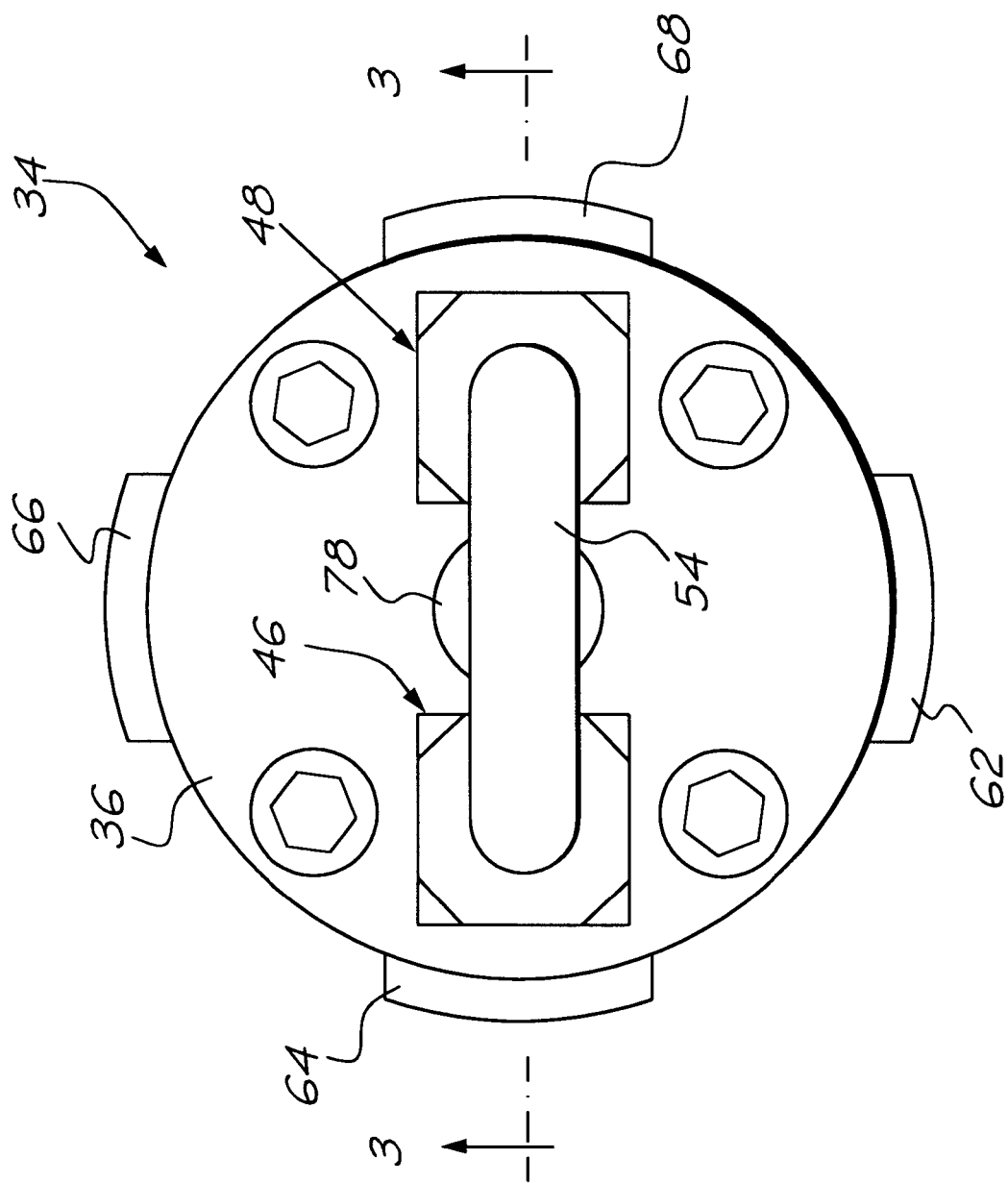
FIG. 2 is a top plan view of a lifting fixture in accordance with an exemplary embodiment of the invention.
Figure 3:
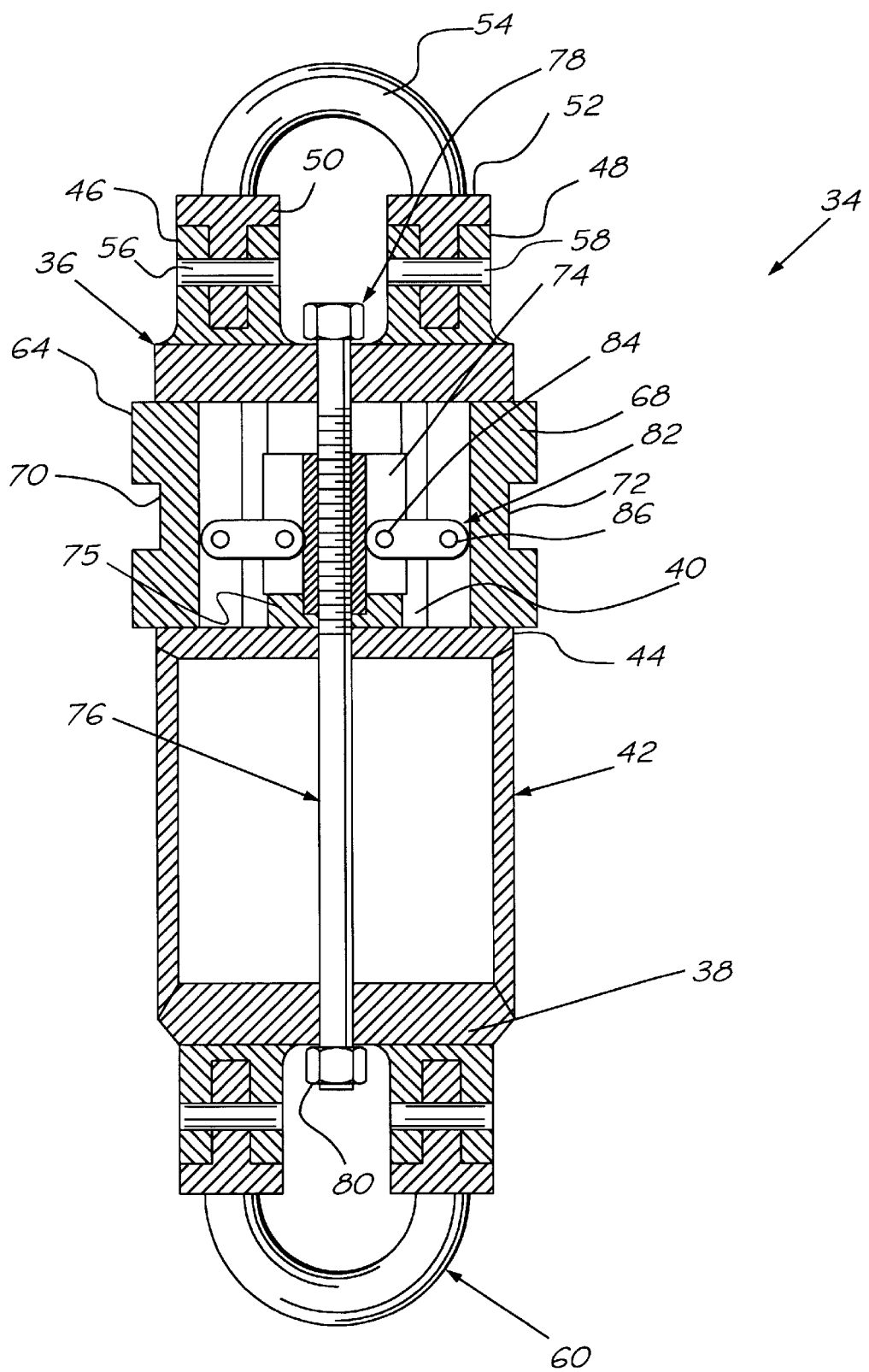
FIG. 3 is a section view taken along the line 3—3 of FIG. 2.

With further reference to FIGS. 2 and 3, the core plate lifting fixture 34 includes a top or upper cap 36 and a lower cap 38 with a housing assembly therebetween, the latter including an upper housing 40 and a lower housing 42. A lower plate 44 of the upper housing 40 is welded to the lower housing 42, and the lower cap 38 is welded to the lower end of the lower housing 42.

Mounted on the top cap 36 are a pair of clevis blocks or yokes 46, 48, in which are pivotally secured respective T-shaped rod ends 50, 52 which are, in turn, welded to a generally inverted U-shaped attachment "eye" or lifting bail 54. Clevis pins 56, 58 are employed to pivotally secure the rod ends within the yokes. As best seen in FIGS. 3 and 4, a second attachment eye or lifting bail 60 is secured to the lower cap 38 in the same manner as described above, but projecting in an opposite direction. With this arrangement, the bails 54 and 60 can be pivoted substantially 90° in either direction from the upright position shown in FIGS. 1 and 3.

Located within radial openings in the upper housing 40 is a jaw assembly including four jaw elements 62, 64, 66 and 68 located at 90° intervals about the upper housing 40. Each jaw has a slot or recess (two shown at 70, 72) approximately mid-way from top to bottom of the respective jaw, the slot or recess adapted to engage the upper and lower plate surfaces about the edge of a hole 22 in the core plate when the fixture 34 is located within the hole as shown in FIG. 1. The jaws are radially movable into locking engagement with the plate 12 by means of an actuator assembly which includes a sleeve 74 threadably engaged on a partially threaded rod or shaft 76 which is held in the fixture by nuts or bolt heads 78, 80 externally of the upper and lower caps 36, 38. Rotation of the shaft or rod 76 will thus cause the sleeve 74 to move up or down on the shaft, depending on the direction of rotation of the latter.

Each jaw 62, 64, 66 and 68 is connected to the sleeve 74 by means of a link 82, pivotally secured at opposite ends by dowel pins 84, 86, thus permitting the link 82 to pivot relative to both the sleeve 74 and respective jaw. Vertical movement of the sleeve thus translates into horizontal radial movement of the four jaws 62, 64, 66 and 68 within the openings in the upper housing. As shown in FIG. 3, when the links 82 are horizontal, the jaws are in their radially outermost, locking position. There is also a stop or spacer 75 for limiting the downward travel of the sleeve 74.

The components of the fixture as described above are made of high strength anti-galling materials which can carry the high moment loads and which enable relative movement of the various components. It is also to be noted that the screw mechanism is generally protected from the application of heavy shear (radial) and moment loads by the upper housing of the fixture.

Figure 5A:
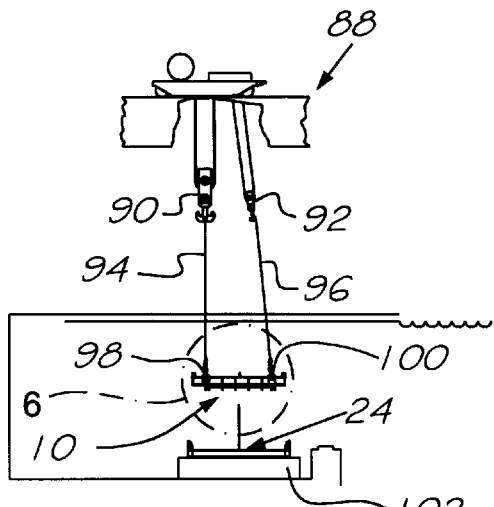
FIGS. 5A through 5H illustrate, sequentially, a lifting and flipping operation for a core plate, using fixtures as shown in FIGS. 2 and 3.
Figure 5B:
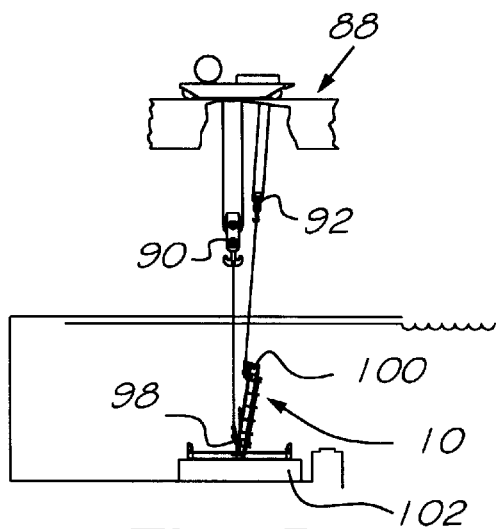
Figure 5C:
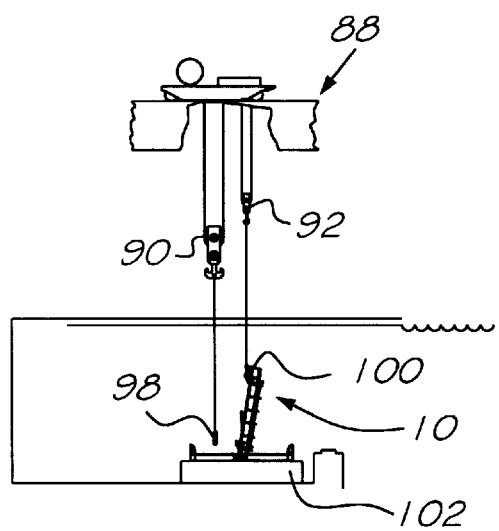
Figure 5D:
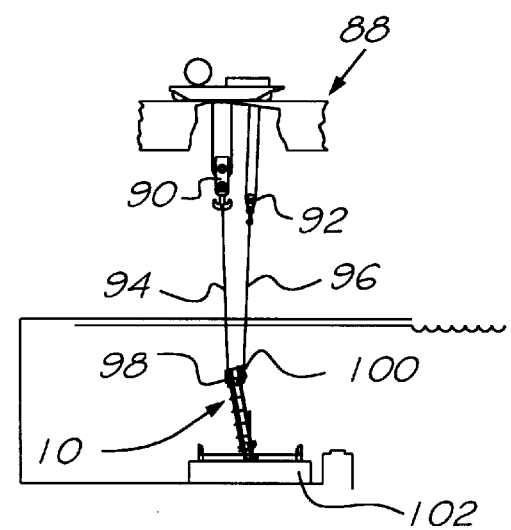
Figure 5E:
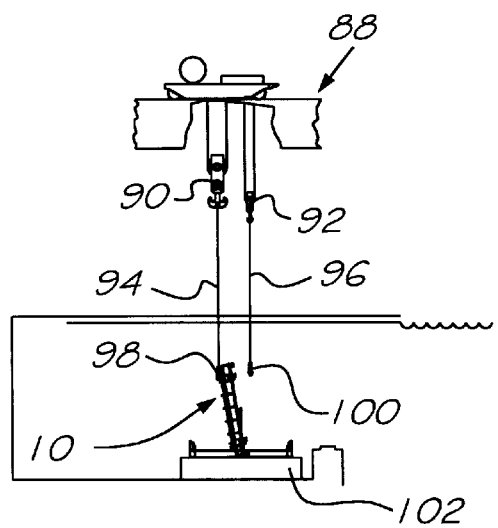
Figure 5F:
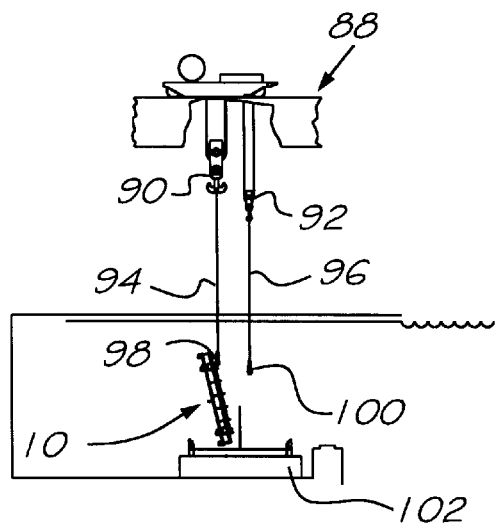
Figure 5G:
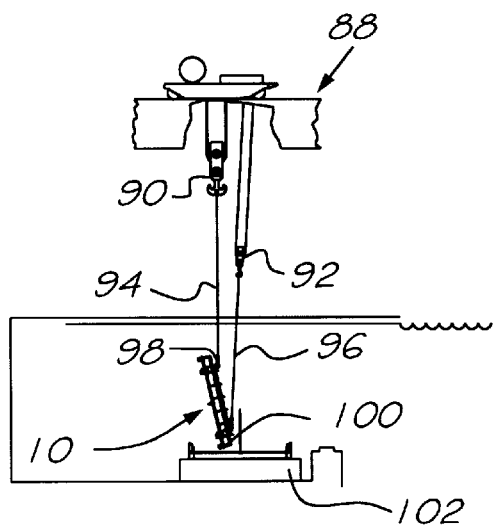
Figure 5H:
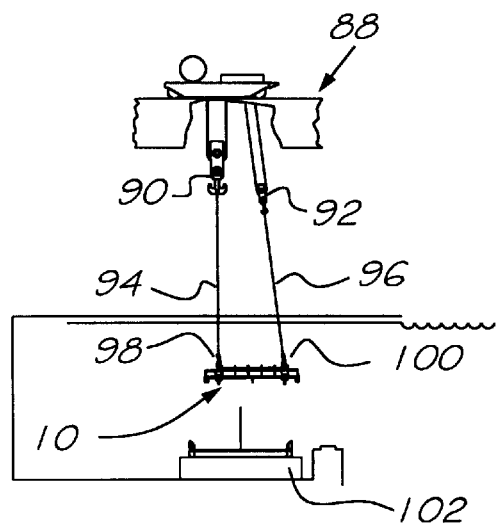
Figure 6:
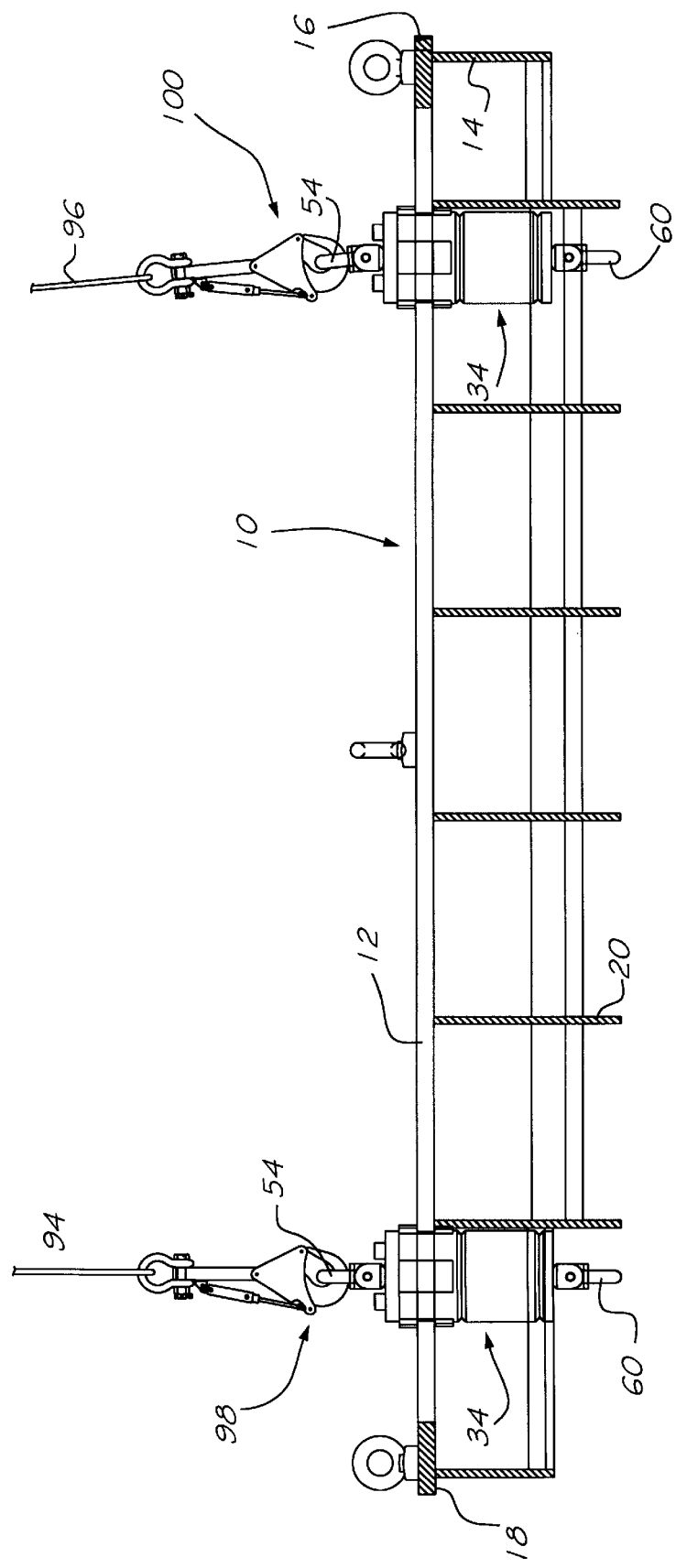
FIG. 6 is an enlarged detail taken from FIG. 5A.

In use, each of the four fixtures 34 is first inserted into a core plate hole 22. The fixture can be swiveled to any desired position. The jaws 62, 64, 66 and 68 are then moved radially outwardly by turning the rod 76 from a remote location by means of a suitable tool engaging the nut or bolt head 78. Access to both bolt heads 78, 80 is facilitated by the ability to pivot the attachment eyes or lifting bails 54, 60 to a substantially horizontal orientation. With reference now to FIGS. 5A–5H as well as FIG. 6, the sequence of steps necessary to lift and flip the core plate from its normal upright orientation to an inverted orientation to facilitate slicing will now be described. A conventional crane 88 is employed, the crane having a large grapple 90 and a smaller grapple 92. The large grapple 90 has the capability to support the entire core plate while the smaller grapple 92 in some cases is capable of supporting half the core plate weight. Cables 94, 96 extend from the respective grapples 90, 92 with hooks 98, 100 (see also FIG. 6) at the free ends of the cables adapted to engage the attachment bails or eyes 54, 60 of the fixtures 34. With reference to FIGS. 5A and 6, the hooks 98, 100 are secured to a selected pair of the four fixtures 34. That will allow the cross plates attached to the bottom of the core plate to be in the vertical position when the core plate is supported by one side. (Typically, only two fixtures are required and the hooks 98, 100 can be attached to whichever two opposite fixtures 34 are most convenient). After the hooks have been attached to a pair of opposed bails or eyes 54, the crane lifts the core plate vertically upwardly in a level orientation as shown in FIGS. 5A and 6. The larger grapple 90 is then lowered, thus tilting the core plate on end, allowing it to rest on the support stand 24. As indicated earlier, the support stand 24 is supported on a rotatable turntable 102. With the core plate in the position shown in FIG. 5B, the hook 98 of the large grapple 90 is released from the core plate as shown in FIG. 5C, and the core plate is rotated approximately 180° to the position shown in FIG. 5D. The hook 98 is then attached to the lifting bail 60 of the same fixture 34 to which the smaller grapple 92 is attached by means of hook 100. Then, the hook 100 of the small grapple 92 is released from the core plate (FIG. 5E), and the core plate is again rotated 180° to the position shown in FIG. 5F. The hook 100 of the small grapple 92 is then attached to the lower lifting bail 60 of a fixture 34 opposite that to which the large grapple hook 98 is secured as shown in FIG. 5G, using the small grapple 92, the core plate is lifted and made level as shown in FIG. 5H. Both grapples are then lowered to deposit the core plate on the support stand 24 in an inverted position, ready for slicing. In order to remove the fixtures 34, the bails 60 are pivoted to a horizontal position and the remote access tool is engaged with the bolt head or nuts 80 and the rod 76 rotated to pull the jaws 62, 64, 66 and 68 radially inwardly, thereby enabling the fixtures 34 to be lifted out of the core plate holes 22 by the grapples 90, 92.

It will be understood that the crane 88 as well as the grapples 90 and 92, along with associated cables 94, 96 and hooks 98, 100 are conventional and themselves form no part of the invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A core plate lifting fixture comprising:
   a housing including an upper portion and a lower portion separated by a horizontal plate;
   a plurality of jaws movable radially in and out of said upper portion of said housing adjacent said horizontal plate for securing the fixture to a component to be lifted, each of said jaws formed with a recess adapted to engage upper and lower surfaces of the core plate about an edge thereof;
   at least one lifting bail extending from one end of said housing; and
   a screw mechanism operatively connected to said plurality of jaws for moving said jaws radially between an inward retracted position and an outward locking position.

2. The lifting fixture of claim 1 wherein said screw mechanism includes a rod, at least partially threaded, extending through said housing and secured at opposite ends to said upper portion and said lower portion of said housing; an internally threaded sleeve mounted for axial movement along said rod upon rotation of said rod; and a pivotable link attached between each one of said plurality of jaws and said sleeve for converting said axial movement of said sleeve into radial movement of said jaws.

3. The lifting fixture of claim 1 wherein said at least one lifting bail is pivotally mounted on said housing.

4. The lifting fixture of claim 1 wherein said at least one lifting bail comprises a substantially inverted U-shaped member having free ends, each free end received in a yoke and secured thereto by a clevis pin.

5. The lifting fixture of claim 1 wherein said plurality of jaws are arranged in an annular array, enabling the fixture to be received and secured in a through hole formed in the core plate.

6. A lifting fixture comprising:

a housing;

a plurality of jaws movable radially in and out of said housing to secure the fixture to a component to be lifted;

at least one lifting bail extending from one end of said housing;

a screw mechanism operatively connected to said plurality of jaws for moving said jaws radially between an inward retracted position and an outward locking position; and a second lifting bail extending from an opposite end of said housing.

7. A lifting fixture comprising:

a housing having an upper portion and a lower portion;

a plurality of jaws movable radially in and out of said housing to secure the fixture to a component to be lifted;

at least one lifting bail extending from one end of said housing; and a screw mechanism operatively connected to said plurality of jaws for moving said jaws radially between an inward retracted position and an outward locking position; wherein said screw mechanism includes a rod, at least partially threaded, extending through said housing and secured at opposite ends to said upper portion and said lower portion of said housing; an internally threaded sleeve mounted for axial movement along said rod upon rotation of said rod; and a pivotable link attached between each one of said plurality of jaws and said sleeve for converting said axial movement of said sleeve into radial movement of said jaws; and wherein said rod has enlarged heads at opposite ends thereof, external of said housing.

8. A lifting fixture comprising:

a housing;

a plurality of jaws movable radially in and out of said housing to secure the fixture to a component to be lifted;

at least one lifting bail extending from one end of said housing;

a screw mechanism operatively connected to said plurality of jaws for moving said jaws radially between an inward retracted position and an outward locking position; and wherein said housing has upper and lower portions separated by a plate, said plurality of jaws located in said upper portion of said housing.

9. A lifting fixture comprising:

a housing;

a plurality of jaws movable radially in and out of said housing to secure the fixture to a component to be lifted;

at least one lifting bail extending from one end of said housing;

a screw mechanism operatively connected to said plurality of jaws for moving said jaws radially between an inward retracted position and an outward locking position; and including a second lifting bail extending from an opposite end of said housing; and wherein said housing has upper and lower portions separated by a plate, said plurality of jaws located in said upper portion of said housing.

10. A lifting fixture comprising:

a housing having opposite ends;

a lifting bail attached to each of said opposite ends;

a plurality of jaws mounted in said housing, between said opposite ends, for radial movement between inward retracted and outward locked positions; and an actuating mechanism for moving said plurality of jaws between said retracted and locked positions.

11. The lifting mechanism of claim 10 wherein said actuating mechanism extends through said housing and is operable from either of said opposite ends.

12. A lifting fixture for a core plate comprising:

a housing having opposite ends;

a plurality of jaws mounted in said housing for radial movement between inward retracted and outward locked positions;

means in said housing for moving said plurality of jaws from said retracted position to said locked position when said fixture is located within a hole in the core plate; and means for enabling attachment of a grapple at either of said opposite ends of said housing.

* * * * *